Nov. 18, 1969  G. T. RANDOL  3,479,639
FLUID-LEVEL INDICATOR FOR MASTER BRAKE CYLINDERS
Original Filed Oct. 20, 1965
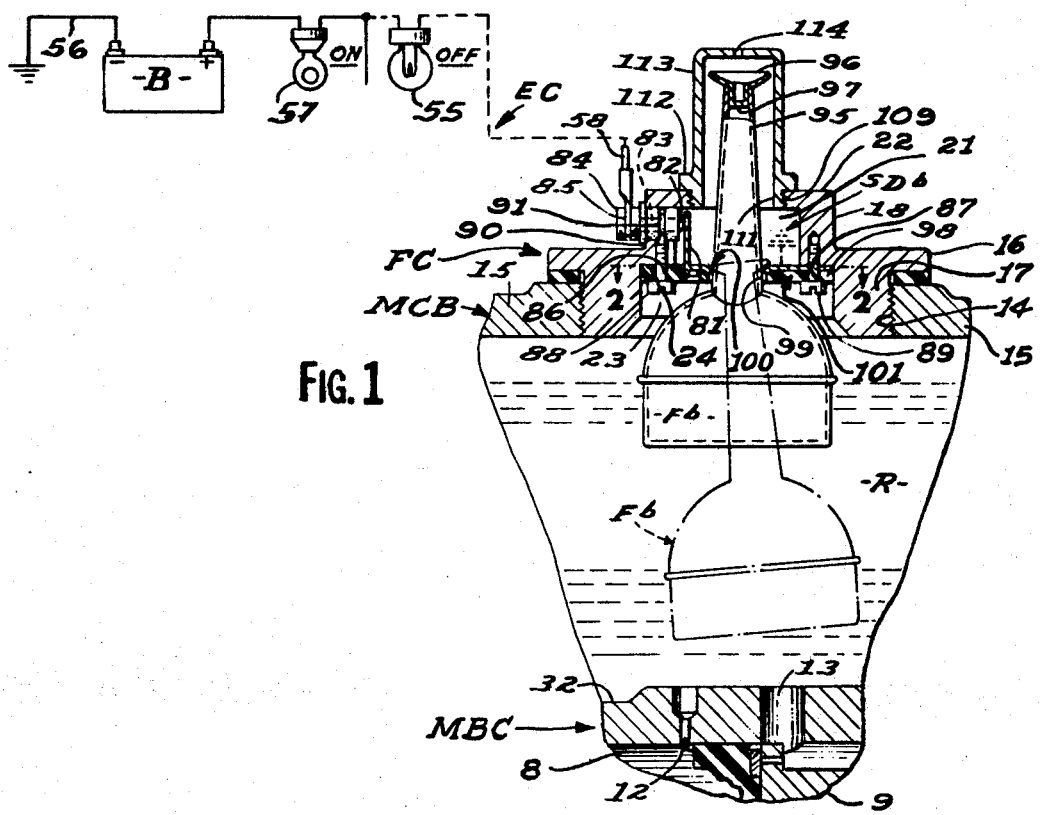

United States Patent Office 3,479,639
Patented Nov. 18, 1969

3,479,639
FLUID-LEVEL INDICATOR FOR MASTER BRAKE CYLINDERS
Glenn T. Randol, P.O. Box 275,
Loch Lynn Heights, Md. 21550
Original application Oct. 20, 1965, Ser. No. 498,329, now Patent No. 3,451,051, dated June 17, 1969. Divided and this application Sept. 4, 1968, Ser. No. 757,397
Int. Cl. B60q 1/00
U.S. Cl. 340—59    8 Claims

ABSTRACT OF THE DISCLOSURE

An apparatus for signalling the level of fluid in the supply reservoir of a master brake cylinder, which includes a float for automatically controlling a switch in an electric circuit to energize a signal device (warning light) upon substantial loss of float buoyancy as a function of an abnormally low level of fluid.

---

This application is a division of my copending application Ser. No. 498,329 filed Oct. 20, 1965 now Patent No. 3,451,051 dated June 17, 1969. The primary object of the invention is to thwart possible brake failure due to loss of brake-fluid from the supply reservoir by providing a fluid level indicator which automatically signals the driver when the fluid recedes to an unsafe level so that proper steps may be taken to restore the fluid within the specified level for safety in braking operations.

More specifically, the invention features a pendulum-type float mechanism wherein the pivotal point thereof defines a switch device comprising an arcuately formed switch contact having universal movement relative to a pair of fixed conductive contacts in spaced relation when the latter are bridged by the movable contact in response to a predetermined fluid level recession in said fluid reservoir, said movable contact cooperating with said fixed contacts to open and close said switch device under control of said float mechanism as a function of variations in the fluid level aforesaid, said float mechanism having a normal vertical position when the fluid is substantially calm, and radially displaceable out of normal position under influence of fluid agitation without interrupting the closed position of said swtich device when the fluid is at or below the aforesaid predetermined level.

Another object related to the object next above is to embody said switch device and float actuatable mechanism therefor in a novel manner in the conventional filler cap or cover for the filler opening of the reservoir to provide a simple and economical after-market accessory available at service stations, car dealers, and automotive parts supply stores over the country and thereby promoting safer vehicular braking control nationwide by enabling drivers and/or car owners to maintain the brake system fully operative insofar as brake-fluid requirements are concerned.

Other and more specific objects, features, and advantages of the present invention will become apparent to persons skilled in the related art, in the course of the following detailed disclosure wherein reference is had to the accompanying drawing exhibiting for illustrative purposes only a preferred embodiment, in which:

FIGURE 1 is a fragmentary longitudinal-vertical sectional view of the conventional master brake cylinder showing my novel brake-fluid level indicator embodied in the removable filler cap for the fluid supply reservoir, and wherein the warning light is "off" to visually indicate a satisfactory level of fluid; and FIGURE 2 is a plan view partly in section taken on an enlarged scale along the line 2—2 of FIGURE 1 to clarify structural details of the stationary switch contacts in particular.

Referring now to the drawing, wherein I have disclosed a fragmentary portion of the conventional pedal-operated master brake cylinder generally designated "MBC" comprising a fluid-working cylinder 8 in which a fluid-pressurizing piston 9 is reciprocably disposed to operate the vehicle brake (not shown), a fluid supply reservoir R adapted for gravitational fluid feed into said cylinder via a compensating port 12 when said piston is fully retracted as shown, and an intake port 13 between said reservoir and non-pressurizing portion of said piston to prevent cavitation in the working cylinder, a threaded filler opening (port) 14 through the top wall of the reservoir body 15, and a removable filler cap "FC" for closing said opening 14 and for draining or replenishment of the brake-fluid as required.

The aforesaid filler cap FC incorporates the invention and comprises an exterior annular flange 16, a reduced diameter externally threaded depending ring-like flange 17, a hollow coaxial exterior embossment (dome) 18 preferably in hexagonal profile for reception of a suitable wrench for manual removal and installation of said cap, said fluid supply reservoir R being mounted integrally atop the master cylinder body generally designated "MCB." The hollow within the dome 18 defines a cylindrical switch chamber 21 closed at its upper end by an integral wall 22, and which opens into a counterbore 23 communicating with the interior of said reservoir R. Juncture of said chamber and counterbore produces an annular shoulder 24.

Projecting upwardly from the central portion of a hollow float F$^b$ is an elongated hollow tapering sleeve (stem) 95 which has a terminal concave switch contact 96 formed with a depending cup-shaped extension 97 pressfitted or otherwise fixed in said hollow atop said stem 95 as shown in FIGURE 1, to move as a unit.

An annular insulative disc 98 is provided with a pair of diametrically opposed holes 86, 87 through which a long and a short cap screw 88, 89, respectively, pass into threaded engagement with aligned holes processed in the aforementioned shoulder 24 thus mounting the disc 98 in fixed operating position within the aforesaid switch chamber 21. The upper end portion of the long cap screw 88 terminates in a smooth reduced diameter extension 90 which projects into an external annular groove 91 formed in the medial portion of an insulative bushing projecting through a hole in the vertical wall of the cap dome 18 as shown and thereby stabilizing said bushing in its installed position shown in FIGURE 1. A central aperture 99 is provided in the aforesaid disc 98 through which the upper portion of the stem 95 loosely passes.

The aforesaid disc 98 is adapted to carry a pair of fixed contact elements 100, 101 best demonstrated by FIGURE 2, said elements being characterized by a pair of horizontal segments 102, 103, respectively, which terminate at their respective inner confronting end portions in spaced arcuate contact portions 104, 105 having tapering inner marginal portions 106, 107 in cross section, and inlaid in recesses correspondingly shaped, respectively, formed in the upper face of said disc. The inner perimeter of said tapering portions defines the aforesaid aperture 99 as shown. A rivet 80 insures stabilization of the contact element 102 which includes an upstanding springy conductive terminal 81 adapted to bear at its upper end against the inner end 82 of a horizontally disposed conductive terminal post 83 fixed in said insulative bushing, the outer end of said terminal post being provided with a knurled and medially grooved head 84 for reception of a detachable split terminal 85 defining one end of a conductor 58, and the outer end portion of the horizontal segment 103 engages the conductive annular shoulder 24 to provide a ground for a switch device SD$^b$ comprising said movable contact 96, contact portions 104, 105. A hole in the segment 103 in alignment with the hole 87 in the disc through which the cap screw 89 passes, is effective to enable the latter to stabilize the contact element 101.

The aforesaid movable contact 96 is adapted to have universal movement with respect to said tapering contact portions 106, 107 when in briding relation to said fixed contacts as depicted by broken lines in FIGURE 1, and thereby completing an energizable electric circuit EC to a signal device (warning light 55) when the fluid level in the reservoir R has reached an abnormally low point as shown by broken lines in FIGURE 1, said circuit being shown de-energized in part and includes said warning light 55 which shows "red" when "on," a battery B having a ground connection 56, a master (ignition) switch 57, and the other end of said conductor 58 connected to one side of said warning light, the latter and said switch 57 being shown in "off" and "on" positions, respectively, of control.

When the level of fluid in said reservoir R reaches an abnormally low point, the warning light 55 is energized upon completion of the circuit EC to provide the driver with visible indication that the brake-fluid should be replenished and the overall braking system carefully inspected to ascertain the cause of such excessive fluid loss before car operation is resumed.

It is important to note that the swivel movement between the concave contact 96 and cooperating fixed tapering portions 106, 107, enables the float F$^b$ to have radial movement about its normal vertical axis demonstrated in broken lines by FIGURE 1, without interrupting the bridging relationship of the fixed contact portions 106, 107, since irrespective of the degree of swing of the float F$^b$ out of vertical, the pivotal surface contact connection between the fixed tapering portions and the movable contact 96 maintains the switch device SD$^b$ closed upon fluid level reaching such low unsafe point as a function of the float F$^b$ lowering to the broken line positions, for example, of FIGURE 1, such radial displacement of the float F$^b$ resulting from agitation of the brake fluid in the reservoir R as is understood.

The central portion of the switch chamber end wall 22 is provided with a threaded hole 109 which receives the threaded portion 111 of an annular flange 112 adapted to engage the upper confronting face portion on said wall 22 as shown, said flange 112 and threaded portion 111 defining the lower open end of an elongated hollow housing 113 closed at its upper end and in which said concave switch element 96 moves into and out of engagement with its cooperating fixed contact portions 106, 107. The closed end of said housing is provided with a central vent hole 114 to maintain the interior of the switch chamber 21 and reservoir R at atmospheric pressure level.

Furthermore, the unitary construction of the hollow float F$^b$ and pendulum-like stem 95 provides a simple and economical means for closing and opening the switch device SD$^b$ as a function of variations in the buoyancy of said float F$^b$, loss of buoyancy enables said float to apply its weight under gravity to bring the pivotal contact 96 into engagement with its cooperating fixed contact portions 106, 107 to close the switch device SD$^b$ whereby the latter remains closed irrespective of swinging movement of the float under influence of the brake fluid in the reservoir being agitated, that is, angulating out of its normal vertical position effective when the fluid is substantially clam, while changes in the fluid level are effective to raise and lower the float F$^b$ accurately for a true reading by the signal light 55 upon closure (bridging) of the fixed contact portions 106, 107 as is understood.

Operational summary

Operation of the present fluid-level indicator is believed manifest from the foregoing disclosure and structural representations of the same; however, in the interest of further clarifications, a brief re-statement will be given particularly emphasizing the special features and advantages provided by the present invention.

When the fluid in the reservoir R reaches the unsafe low level shown by broken lines in FIGURE 1, the pendulum-type float F$^b$ drops accordingly thus lowering the concave contact 96 into bridging relationship with the aforesaid fixed contact portions 106, 107 to complete the electric circuit EC thus turning the signal light 55 "on" which is mounted on the dash panel of the vehicle for an unobstructed view by the driver. Under such circumstances, the signal light 55 indicates to the driver that the fluid-level in the master cylinder reservoir R is at an unsatisfactory low point. The light 55 may show a red warning signal either by the light itself or through a panel of red colored glass in front of the light bulb as is understood. Also the housing 113 may be made of transparent plastic material and the concave movable contact 96 colored red, for example, thus visible through the wall of said housing 113 to provide an under-the-hood indicator of the fluid level status. When the colored contact 96 is at the upper end of the housing 113, the level of fluid is satisfactory but should the contact 96 drop to midpoint or below such would indicate that the fluid in the reservoir is too low to maintain normal float buoyancy and, therefore, should be replenished to the specified level for safe brake operations.

By utilizing both the colored contact 96 and the signal light 55, even though the engine is turned "off," and the light "off," the colored contact visible through the transparent housing 113 provides a safety feature when under-the-hood servicing is being made so that the serviceman can see at a glance the status of the fluid level which if at an unsafe level would also be indicated to the driver by the signal light 55 when the switch 57 is turned "on" thus providing a double-safety check on the fluid-level in the brake system.

The pendulum-type construction of the float mechanism provides special advantages in the maintenance of the electric circuit EC completed upon the movable contact 96 coming into bridging contact with the pair of fixed contact portions 106, 107, thus irrespective of the extent of radial displacement of the float mechanism out of its normal vertical position when the fluid is substantially calm, the universal contact movement between the contact 96 and tapering fixed contact portions 106, 107, maintains the switch device SD$^b$ closed until sufficient fluid is added to the reservoir R to restore normal float buoyancy and thereby opening the switch device SD$^b$ to turn the signal light 55 "off."

The aforedescribed pendulum-type movable contact element 96 defines an arcuate pivotal contact element cooperable with said pair of fixed tapering contacts 105, 107 in spaced relationship, to produce an extremely simple and effective switch device for the purpose. The lower end of the pendulum element 95 is provided with the aforesaid float F$^b$ to serve as the weight whereby agitation of the brake-fluid in the reservoir R moves the float correspondingly without disturbing the closed-contact relationship at the arcuate pivotal contact of the pendulum action. It should be noted that the pair of fixed contacts 106, 107 may be constructed with straight or curving contact surfaces in cross section, and the horizontal segments 102, 103 are inlaid in complemental recesses, respectively, formed in the upper surface of the insulative disc 98 with their upper sides flush as shown in FIGURE 1.

Having thus described my invention, I claim:

1. A fluid-level indicator for use with a master brake cylinder in operative association with the supply reservoir therefor having a filler port closed by a removable chamber-defining filler cap, the improvement which comprises: a walled switch chamber in said cap closed at one end and opening at the other end into said reservoir; a pair of contacts insulatively fixed through the wall of said switch chamber in spaced confronting relationship; an elongated switch-actuating member of the pendulum-type projecting loosely from the switch chamber through the open end of the latter into said reservoir; a rockable switch contact defining the terminal portion of that end of said actuating member in said switch chamber, said member pivotally cooperating with said pair of fixed contacts to bridge the same; a float defining the reservoir end portion of said actuating member to actuate the latter in one direction upon substantial loss of float buoyancy to bridge said pair of fixed contacts; an energizable electric circuit including in series energizing means therefor, said pair of fixed contacts, and an indicating device energizable to produce a discernible signal to the physical senses upon completion of said circuit in response to bridging said pair of fixed contacts as a function of such loss of float buoyancy due to an abnormally low level of fluid in said reservoir, said rockable contact when in bridging relationship with respect to said pair of fixed contacts enabling said float and connected actuating member to have pivotal swinging movement induced by agitation of the fluid in said reservoir out of its normal substantially calm status without unbridging said pair of fixed contacts.

2. A fluid-level indicator for use with a master brake cylinder in operative association with the supply reservoir therefor having a filler port closed by a removable chamber-defining filler cap, the improvement which comprises: a walled switch chamber in said cap closed at one end and opening at the other end into said reservoir; a fixed insulative plate associated with the open end of said switch chamber; a central aperture through said plate; a pair of fixed contacts in spaced confronting relationship inlaid in the upper surface of said plate; an elongated hollow switch-actuating member projecting loosely from the switch chamber through said aperture into said reservoir; a rockable concave switch contact detachably mounted atop said actuating member in said switch chamber, said member being pivotally cooperative with said pair of fixed contacts to bridge the same; a float defining the reservoir end portion of said actuating member to actuate the latter in one direction upon substantial loss of float buoyancy to bridge said pair of contacts; an energizable electric circuit including in series energizing means therefor, said pair of fixed contacts, and an indicating device energizable to produce a discernible signal to the physical senses upon completion of said circuit in response to bridging of said pair of fixed contacts as a function of such loss of float buoyancy due to an abnormally low level of fluid in said reservoir, said rockable contact when in bridging relationship with respect to said pair of fixed contacts enabling said float and connected actuating member to have pivotal swinging movement on said pair of fixed contacts induced by agitation of the fluid in said reservoir out of its normal substantially calm status without unbridging said pair of fixed contacts.

3. A fluid-level indicator constructed in accordance with claim 2 in which said filler cap comprises: an apertured top end wall from which projects an elongated outstanding hollow housing open at its inner end and closed at its outer end, said rockable contact having universal movement within said housing and said pair of fixed contacts being positioned adjacent the inner open end of said housing, and means for detachably stabilizing said cap in sealing relation over said filler port.

4. A fluid-level indicator constructed in accordance with claim 3 in which said elongated housing is transparent.

5. A fluid-level indicator constructed in accordance with claim 4 in which said actuating member is characterized by rectilinear movements along a vertical axis and radial relative movements with respect to said axis as a function of undulating fluid movements of said float.

6. A fluid-level indicator constructed in accordance with claim 2 in which said filler cap comprises: an exterior annular flange having an offset externally threaded depending ring-like flange and a cup-shaped walled embossment upstanding in the opposite direction and having a hexagonal profile and a centrally apertured bottom wall, a counterbore in continuous communication with the interior of said embossment, an annular shoulder defined by the juncture of said embossment and said counterbore, and an elongated hollow housing closed at one end and open at the other end and fixedly upstanding from said bottom wall coaxially with the open end communicating with said aperture therein to accommodate movement of said rockable contact under influence of said float.

7. A fluid-level indicator constructed in accordance with claim 6 in which said insulative plate and inlaid pair of fixed contact elements carried thereby are made fast on said annular shoulder by a long and a short capscrew passing through a pair of diametrically opposed holes, respectively, in said plate into threaded engagement with a pair of aligned holes, respectively, in said annular shoulder, one of said contact elements engaging said shoulder to produce a ground connection, the other contact element being provided with an upstanding springy conductive terminal, an insulated terminal post in continuous contact with said springy terminal, a conductor leading from said terminal post to one side of said indicating device, and means for stabilizing said contact elements on said plate.

8. A float-actuated fluid level indicator for master brake cylinder reservoirs characterized by a filler opening and a removable filler cap for closing said opening, the improvement which comprises: a switch device incorporated in said filler cap and having a pair of spaced fixed contacts and an elongated contact element having a float radially swingable from normal vertical position in accordance with changes in the fluid level out of normal horizontal in said reservoir, said pair of fixed contacts when bridged by said swingable contact element producing a pivotal connection therebetween to maintain said bridging relationship effective irrespective of radial movement of said float from its normal vertical position, said fluid in the reservoir when between full and an abnormally low level being effective to raise said float and connected swinging contact element out of bridging relationship with respect to said pair of fixed contacts; an indicating device energizable for producing a physically discernible signal; and an energizable electric circuit including energizing means therefor for energizing said indicating device upon said pair of fixed contacts being bridged by said swinging contact element to compete said circuit in response to lowering of said float as a function of an abnormally low level of fluid in said reservoir.

References Cited

UNITED STATES PATENTS 2,278,279 4/1942 Morris _____ 340—59
2,811,600 10/1957 Storck et al. _____ 340—59
3,319,240 5/1967 Mirarchi et al.

JOHN W. CALDWELL, Primary Examiner

H. COHEN, Assistant Examiner

U.S. Cl. X.R.
73—308; 200—84